United States Patent [19]

Lin et al.

[11] Patent Number: 5,225,147
[45] Date of Patent: Jul. 6, 1993

[54] REAL TIME ANALYSIS OF LIGHT WATER CORE NEUTRONICS

[75] Inventors: Eric K. Lin, Beltsville; James Lin, North Potomac, both of Md.

[73] Assignee: General Physics International Engineering & Simulation, Inc., Columbia, Md.

[21] Appl. No.: 845,531

[22] Filed: Mar. 4, 1992

Related U.S. Application Data

[63] Continuation of Ser. No. 761,336, Sep. 17, 1991, abandoned.

[51] Int. Cl.$^5$ .............................................. G21C 7/36
[52] U.S. Cl. ....................................... 376/216; 376/254; 376/245
[58] Field of Search ............... 376/245, 215, 216, 217, 376/254; 364/140, 222.1, 143, 221.6, 226.9; 976/DIG. 113, DIG. 138, DIG. 296

[56] References Cited

U.S. PATENT DOCUMENTS

| | | | |
|---|---|---|---|
| 3,916,444 | 10/1975 | Alliston et al. | 444/1 |
| 3,932,885 | 1/1976 | Czerniejewski | 444/1 |
| 4,061,906 | 12/1977 | Grebe et al. | 364/735 |
| 4,876,057 | 10/1989 | Bernard et al. | 376/216 |

OTHER PUBLICATIONS

Borresen, "A Simplified, Coarse Mesh, Three-Dimensional Diffusion Scheme for Calculating the Gross Power Distribution in a Boiling Water Reactor," *Nucl. Sci. Engr.*, 44, 37 1971, pp. 37-43 [spec. pp. 1,2].

Wulff et al., "A Description and Assessment of RAMONA-3B Mod. 0 Cycle 0.4 A computer code with Three-Dimensional Neutron Kinetics for BWR Transients," NUREG/CR-3664, Brookhaven National Laboratory, Jan. 1984, [spec. pp. 2, 27].

Meneley et al., "Influence of the Shape Function Time Derivative in Spatial Kinetics," *Trans. Am. Nucl. Soc.* 11, 225-26, 1968 [spec. p. 25].

Ott, "Quasistatic Treatment of Spatial Phenomena in Reactor Dynamics" *Nucl. Sci. Engr.* 26, 563-65, 1966 [spec. p. 25].

Henry, "The Application of Reactor Kinetics to the Analysis of Experiments," *Nucl. Sci. Engr.*, 3, 52-70 1958 [spec. p. 25].

Henry, et al., "Verification of a Method for Treating Neutron Space-Time Problems, " *Nucl. Sci. Eng.*, 4, 727-744, 1958. [spec. p. 25].

Stout, "XTG: A Two-Group Three Dimensional Reactor Simulator Utilizing Coarse mesh Spacing and Users Manual (PWR Version)," XN-CC-28, Exxon Nuclear Company, Jul. 1976 [spec. p. 27].

*Primary Examiner*—Donald P. Walsh
*Assistant Examiner*—Meena Chelliah
*Attorney, Agent, or Firm*—Davis Hoxie Faithfull & Hapgood

[57] ABSTRACT

An improved method for monitoring the parameters of a nuclear core reactor, analyzing the monitored parameters using modified two neutron group diffusion equations that have been subjected to space-time factorization such that the factorized shape functions are approximated, and determining the core neutronics in constant time steps, for example, about 0.25 seconds, thereby to provide analysis and simulations in full range of core neutronics in real-time continuously.

24 Claims, 2 Drawing Sheets

Microfiche Appendix Included
(1 Microfiche, 2 Pages)

REAL TIME ANALYSIS OF LIGHT WATER CORE NEUTRONICS

This is a continuation of copending application Ser. No. 07/761,336 filed on Sep. 17, 1991 abandoned.

This application is accompanied by a microfiche appendix having 2 microfiche films.

A portion of the disclosure of this patent document contains material which is subject to copyright protection. The copyright owner has no objection to the facsimile reproduction by any one of the patent disclosure, as it appears in the Patent and Trademark Office files or records, but otherwise reserves all copyright rights whatsoever.

FIELD OF THE INVENTION

This invention relates to analyzing light water reactor core neutronics in real-time, more specifically to determining core neutronics for simulation training and engineering analyzers.

BACKGROUND OF THE INVENTION

In the field of nuclear power facilities, it is important to analyze the reactor core neutronic properties for maintaining the nuclear power facility and training reactor operators to perform routine and emergency monitoring procedures. Heretofore, core neutronics for a light water reactor have been analyzed using engineering codes, such as the coarse mesh method described in Borresen, "A simplified, Coarse-Mesh, Three-Dimensional Diffusion Scheme for Calculating the Gross Power Distribution in a Boiling Water Reactor," *Nucl. Sci. Engr.*, 44, 37, 1971, and methods of the RAMONA-3B code described in Wulff et al., "A Description and Assessment of RAMONA-3B Mod. 0 Cycle 4: A Computer Code with Three-Dimensional Neutron Kinetics for BWR System Transients," NUREG/CR-3664, Brookhaven National Laboratory, January 1984. These codes provide methods for providing a set of core neutronics parameters in a defined circumstance and analyzing or determining the resultant reactor core neutronics parameters in response to the given conditions.

The Borresen reference refers to obtaining core neutronics data and solving modified two-group neutron diffusion equations for the two types of neutrons inside the core, namely the fast neutrons and the thermal neutrons. A thermal neutron may be considered as a fast neutron that has slowed down. More specifically, the reactor core is represented as a number of nodes that are spaced apart such that the fast neutrons have a relatively large mean free path (i.e., diffusion length) and the thermal neutrons have a low leakage from node to node. This permits using an approximation for the thermal neutrons leakage and a modification of the two-group equations to simplify the number of steps required to determine the core neutronics for the given conditions.

RAMONA-3B, developed by the Brookhaven National Laboratory, uses the Borresen coarse mesh method and also relies on the fast neutrons as the determining criteria. However, the RAMONA-3B method relies on solving the two-group neutron diffusion equations by a finite difference method to determine the core neutronics for the given conditions.

One of the problems with these known techniques is that the model does not have the capability to run the code from power plant start up to shutdown continuously in real time. They do not have the ability to analyze dynamic or static conditions in real-time. Consequently, they are limited in their application to selected transient conditions. Further, those known techniques are not sufficiently flexible to train operators under a wide variety of conditions or in real-time environments.

It is therefore, an object of the present invention to provide for determining core neutronics in a real-time environment. It is another object to provide for a real-time analysis of core neutronics that can be used for simulation training of facility operators and for engineering analysis of core neutronics, separately or simultaneously.

It is another object of the invention to provide for determining core neutronics in response to rapid transient conditions in a real-time environment.

It is another object of the invention to provide a real-time analysis of core neutronics under normal and emergency operating conditions.

It is another object of the invention to simulate real-time core neutronics under normal, emergency, and beyond design conditions continuously.

SUMMARY OF THE INVENTION

The present invention provides for methods and apparatus for sensing the core neutronic parameters of a nuclear reactor core and analyzing and determining the core neutronics in a real-time environment.

One aspect of the present invention concerns real-time analysis of light water reactor core neutronics in detailed three-dimensional geometry. More specifically, a method is provided including modeling the reactor as a plurality of nodes in a conventional manner, monitoring the pertinent input core neutronics parameters for the type of reactor core, providing time dependent two group neutron diffusion equations that have been subjected to a space-time factorization of the neutron flux and delayed neutron precursors by amplitude and shape, substituting a coarse mesh finite difference approximation for fast neutron shape functions and determining the resulting core neutronics by application of the modified time dependent, two-group neutron diffusion equations, using a constant time step in the calculations. Preferably, the time step is not less than one quarter second.

Another aspect of the invention concerns a method for determining the neutronics parameters of a reactor core. One such method comprises the steps of:

representing the reactor core as a plurality of nodes;

monitoring selected neutronic parameters of the reactor core;

providing time-dependent two group neutron diffusion equations coupled to delayed neutron precursor concentrations that have been subjected to space-time factorization by shape and amplitude functions in response to the plurality of nodes, sensing the monitored parameters; and determining the core neutronics parameters in response to the sensed parameters and the provided two group neutron diffusion equations in constant time steps, the time steps being less than one quarter second.

Preferably, the method includes the step of selecting a coarse nodal representation of the reactor core and a time step for sensing the monitored parameters and determining the core neutronics parameters in a real-time environment.

The solution methods in solving the shape functions and the amplitude functions are in real time, thereby providing the capability for simulating the full range of operation of a core continuously. The reference to the full range of operation of a core continuously should be understood to include, without limitation, transient, steady states, malfunction, and shutdown operations of the core.

Preferably, for a pressurized water reactor, (PWR), each fuel assembly is represented as a radial node and for a boiling water reactor (BWR), each control cell having four fuel bundles surrounding a control blade position is represented as a radial node. Each radial node should have the same size. For BWRs, nodes on the core periphery will consist of fewer bundles. It should be understood that each radial node may have a plurality of radial nodes. Preferably the number of radial nodes is the same for each radial node, for example, from 8 to 24 axial nodes. This is known as a coarse node or coarse mesh model which permits use in a real-time environment.

In a preferred embodiment, the invention also provides for monitoring certain thermohydraulic parameters associated with the reactor core, non-condensibles, and soluble boron quantities, and analyzing xenon and samarium concentrations and decay heat in the reactor core. The foregoing sensed thermohydraulic parameters are preferably provided by a real-time thermohydraulic analysis which is described in the copending and commonly assigned U.S. patent application Ser. No. 07/761,000, filed Sep. 17, 1991, entitled "REAL-TIME ANALYSIS OF POWER PLANT THERMOHYDRAULIC PHENOMENA", in the names of Guan-Hwa Wang and Zen-Yow Wang, which application is hereby incorporated by reference herein. This provides for simulator training and engineering analysis of a wide range of power plant scenarios, such as feedbacks between thermohydraulics and neutronics, operational and severe transients, human factor research, and design modification analysis.

One advantage of the present invention is that it provides for analyzing a wide variety of fast transients, including, for example, thermohydraulic transients in the nuclear steam supply system, control rod movement, soluble boron changes, and xenon effects. Consequently, the invention can be used to simulate and to analyze core neutronics during startup and normal operation, anticipated operational occurrences, design-basis accidents, and many beyond design-basis accidents.

Another advantage of the present invention is that it can be incorporated into a modern minicomputer or engineering workstation and utilized in a real-time environment. This provides for increased flexibility, particularly for simulation training of operators and real-time engineering analysis. Further, such a computer can be located in, near or remote from the control room of the reactor, thus providing for real-time simulation without interfering with the supervision or operation of the reactor.

Another advantage of the invention is that it is compatible with many NRC-approved safety engineering analysis codes that are currently used for fuel management and reload safety analysis, thus providing for enhanced core neutronics analysis and simulation. The input data required by those engineering analysis codes can be easily adopted as the input data for the present invention.

BRIEF DESCRIPTION OF THE DRAWINGS

Further features of the invention, its nature and various advantages will be more apparent from the accompanying drawings and the following detailed description of the invention in which like reference numerals refer to like elements, and in which.

DETAILED DESCRIPTION OF THE INVENTION

Figure 1:
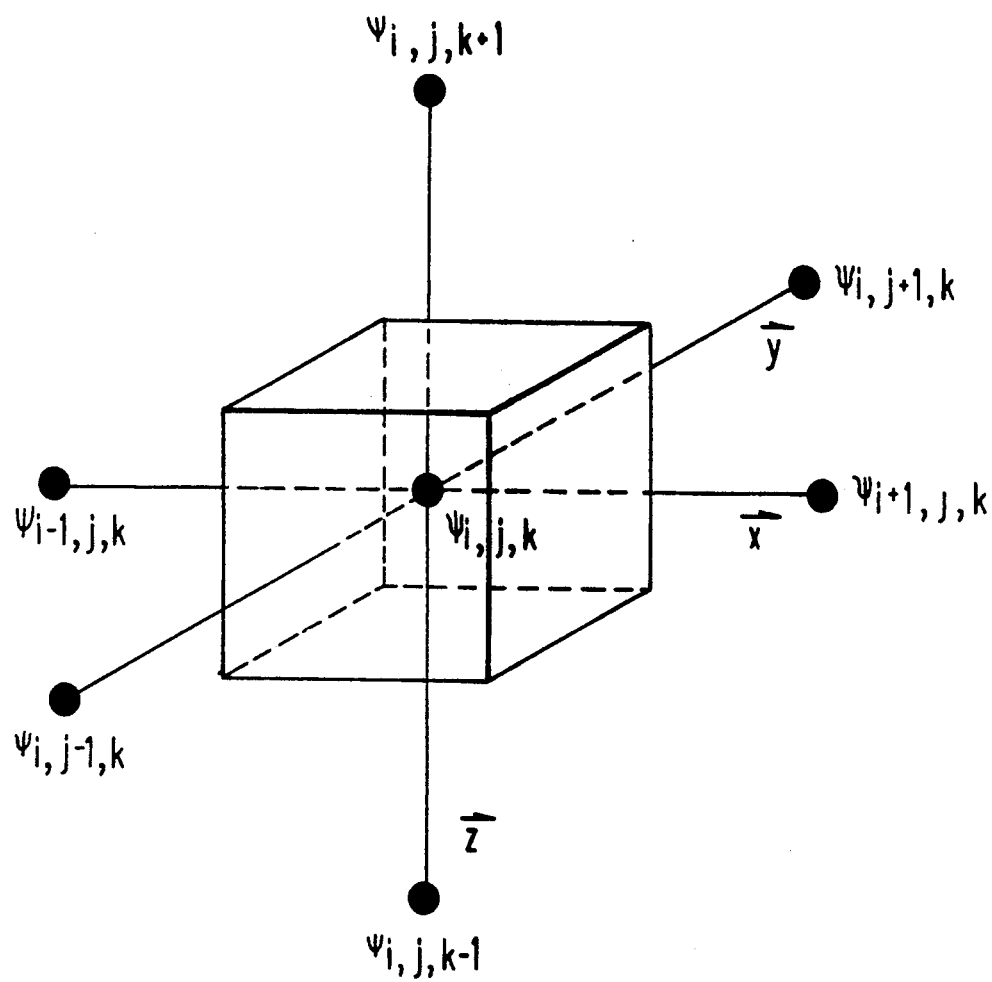
FIG. 1 is an elevated perspective view of a node diagram for a reactor core.

Referring to FIG. 1, a typical node of a nuclear reactor core is shown having a mesh configuration. The x, y, z mesh is conventionally described by a (i, j, k) nomenclature, respectively. The three dimensional spacing of hx, hy, hz is subject to the restriction that $hx = hy \neq hz$.

Figure 2:
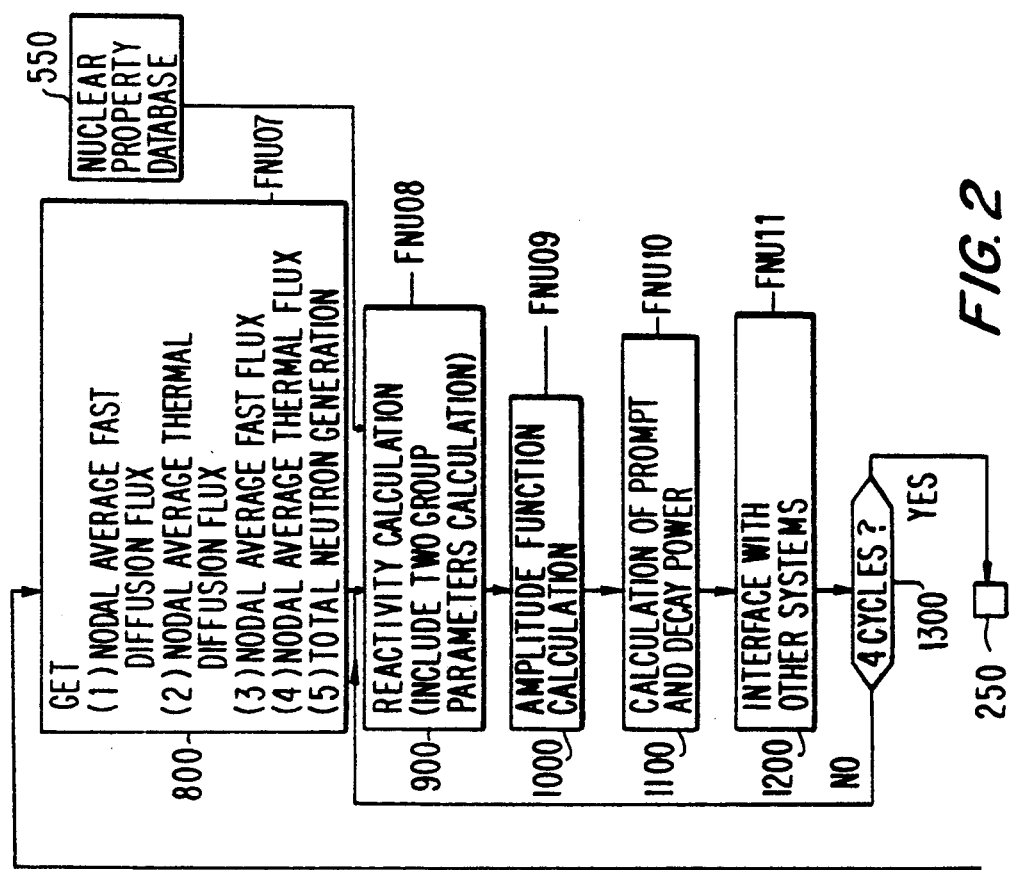
FIG. 2 is a flow chart of the method of a preferred embodiment of the present invention.
Figure 2:
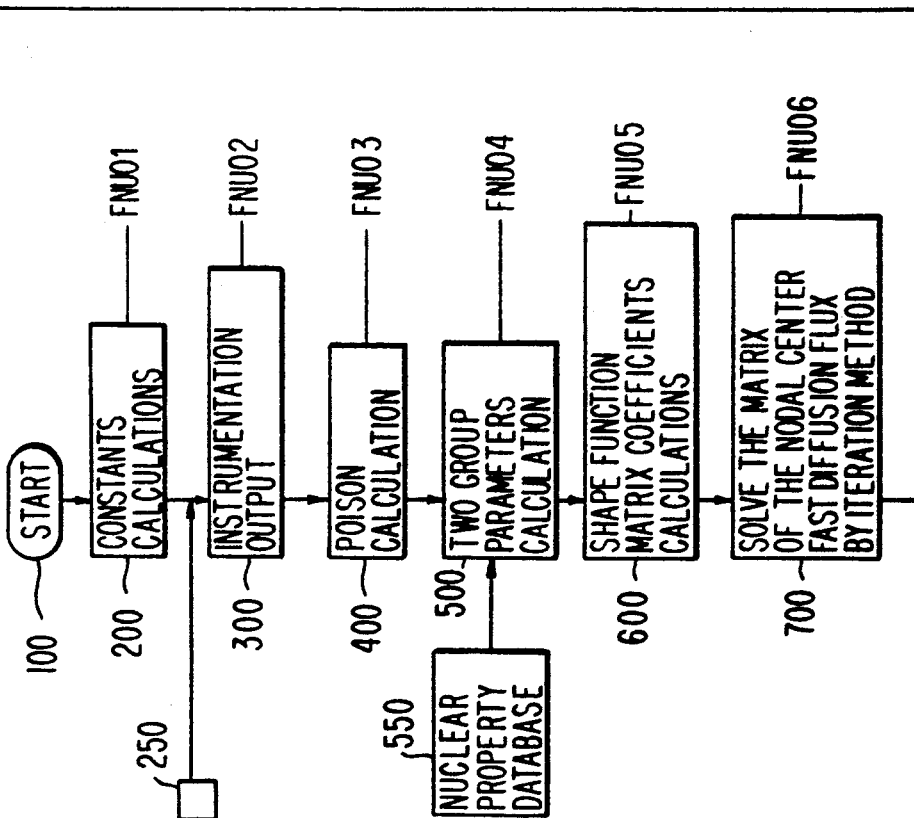

Referring to FIG. 2 and the software listing of the microfiche appendix, one embodiment of the present invention is implemented as a method for determining one or more core neutronic parameters in response to sensed neutronic parameters, a nuclear property database, certain instrumentation, and the two neutron group diffusion equations that have been subjected to space-time fractionization such that certain assumptions are made regarding the several shape functions so that a relatively large time step may be used to provide an engineering analysis or simulation of core neutronics in real-time. The nature of the provided two neutron group equations and their fractionization is discussed in greater detail below and the equations applied are in the software routines. The flowchart is discussed with cross-references to certain software routines in the microfiche appendix.

The routine of this embodiment of the present invention begins at Start 100 which sequences through a series of directive modules DNU01–06 for initializing the program and calling various subroutines. The directive modules call a variety of subroutines for establishing the initial characteristics of the core being analyzed. Following intialization, at point 200 subroutine FNU01 is called to determine constants that are derived from the raw data sensed and the characteristics of the core. Routines SNUCG01–08 are included in the subroutine FNU01.

Routine SNUCG01 calculates numbers of neighboring nodes for each node and the node identification number of its neighboring nodes. It is based on the number of nodes in each row and determines the number of neighboring nodes for each node and identification numbers for the neighboring nodes.

Routine SNUCG02 calculates the eccentricity of the node, and the weighting factors for use in the average nodal fast flux calculation. The input parameters are the center flux weighting factor, the nodal length in x-y direction, nodal length in the z direction, and provides the weighting factor for center fast flux and average fast flux, the eccentricity of the node, and the volume of the node.

Routine SNUCG03 calculates the boundary related constants. This routine uses as inputs the parameters designated as d1 of reflector at side boundary, sigma1 of reflector at side boundary, d1 of reflector at top boundary, sigma1 of reflector at the top boundary, d1 of reflector at bottom boundary, sigma1 of reflector at the bottom boundary, nodal length in x-y direction, nodal length in the z direction, weighting factor for center fast flux, weighting factor for average fast flux, eccentricity of the node, number of neighbors of a node, velocity of fast neutron, velocity of thermal neutron and d1 used for shape function calculation. The routine provides the following outputs, weighting factor for center flux, constant for g3 function, constant for g4 function, v1*dt, v2*dt, area/exlseff, area/exlteff, and area/exlbeff, the latter three of which are used in the reactivity calculations.

Routine SNUCG04 calculates delayed neutrons related constants, based on the velocity of fast neutrons, dt for shape function calculation, delayed neutron fraction g1 calculation, delayed neutron decay constant.

Routine SNUCG05 calculates amplitude related constants based on dt for amplitude function calculation, delayed neutron fraction for each group, and the delayed neutron decay constant.

Routine SNUCG06 calculates the properties of the reflector based on the density of the reflector at the top, side, and bottom boundaries.

Routine SNUCG07 calculates the poison related constants. It uses as inputs the dt for shape function calculation, xenon decay constant, iodine decay constant, promethium decay constant, and the yields of xenon, iodine and promethium.

Routine SNUCG08 calculates the decay heat related constants based on the dt for shape function calculation and the decay constants of each fission product group.

The routine next proceeds to point 300, where subroutine FNU02 is called. This routine calculates the reactivity terms which are independent of interface parameters. More specifically, it defines terms which remain unchanged while calculating reactivity at four cycles per second.

The routine next proceeds to point 400, where subroutine FNU03 is called. This routine calculates the poisons in the core, specifically, the concentrations of xenon, samarium, iodine, and promethium.

The routine next proceeds to point 500, where subroutine FNU04 is called. This routine calculates basic two group parameters as a function of mixture density, control rod fraction, fuel temperature, boron concentration, xenon concentration, and samarium concentration. The basic parameters are determined under the variable names nusigmaf1, nusigmaf2, nusigma12, d1, sigmaa1, and sigmaa2. These parameters are calculated using the nuclear property database 550 which contains two group cross sections for each fuel type.

The routine next proceeds to point 600, where subroutine FNU05 is called. This routine calculates weighting factors of neighboring fast neutron fluxes which are coupled with the nodal center fast neutron flux. The coefficients of the solution matrix are calculated, and the elements of the source term (right hand side) vector are calculated.

The routine next proceeds to point 700, where subroutine FNU06 is called. This routine solves the matrix by using a modified Gauss-Seidel iteration method with successive-over-relaxation.

The routine next proceeds to point 800, where subroutine FNU07 is called. This routine calculates the nodal average fast and thermal fluxes and diffusion fluxes and performs the normalization of these fluxes. It includes determining the nodal average fast diffusion flux, the nodal average thermal diffusion flux, renormalization of the diffusion fluxes, total neutrons generated from fission, delayed neutron precursors distributions, source term attributed by delayed neutron precursor, and resets the integral term in delayed neutron shape function calculations.

The routine next proceeds to point 900, where subroutine FNU08 is called. This routine performs the reactivity calculation.

The routine next proceeds to point 1000, where subroutine FNU09 is called. This routine calculates the amplitude function by a variable implicit method. More specifically, it defines local variables, determines a mean neutron generation time, uses a period constant and a constant for the neutron amplitude calculation, performs the neutron amplitude calculation, determines amplitude function for each delayed neutron precursors, and determines an integral term for the delayed neutron precursor shape function calculations.

The routine next proceeds to point 1100, where subroutine FNU10 is called. Routine FNU10 calculates the values for prompt and decay power for each node and the total prompt and decay power. More specifically, it determines an average fission yield, a prompt power for each heat slab in the reactor core, the decay heat precursor concentration and the decay power for each heat slab, the total power in the reactor core for each heat slab, and the total prompt and decay power.

In the preferred embodiment, following determination of these parameters, the routine then proceeds to point 1200 where subroutine FNU11 is called. Routine FNU11 is used for interfacing with other systems associated with the present invention for receiving sensed or measured parameters acquired external to the core neutronics analysis system, and for providing sensed core neutronics and determined core neutronics to external systems for use in their respective analytic or determinative functions. Thus, the core neutronics analysis methods of the present invention can be incorporated into a more comprehensive system for analyzing or simulating various or all processing functions of a nuclear power plant. For example, preferably, the external systems are used to provide certain thermohydraulic data useful in the determination of core neutronics parameters, , for example, average fuel temperature, axial distribution of moderator temperature, fuel average temperature, void fractions, liquid density and gas density, lateral distribution of moderator temperature, fuel average temperature, and void fractions, lateral distribution of liquid density and gas density, and mixed moderator density. It should be understood however, that the present invention may be appropriately modified to monitor and sense these parameters directly in a conventional fashion, rather than obtaining such parameters from another monitoring system. Further, it should be understood that when another system is used to provide parameters for use in the present invention, that other system is compatible in monitoring the applicable parameters, for example, using the same sampling frequency for use by the present invention.

Following the interface at point 1200, the routine then is interrogated at point 1300 to determine whether it has processed through four reactivity calculation cycles. If it has, then the routine passes through port 250, returns to point 300, and the calculation cycle begins again. If instead the reactivity calculation has not completed four cycles, then the routine returns to point 900 and proceeds through the calculations again.

The routine also relies on several subroutines to determine nuclear property data. These routines include samp1b, samp2b, samp3b and samp4b for use in the reactivity calculation. For shape function calculation, the routines include sprop1b, sprop2b, sprop3b, sprop4b, sprop5b, sprop6b and sprob7b, are used to determine the required nuclear property data.

The present invention is in part based on an application of the well-known set of time-dependent neutron diffusion equations for two neutron energy groups. These equations can be expressed as:

$$\frac{1}{v_1} \frac{\partial \phi_1(r,t)}{\partial t} = \nabla \cdot D_1(r,t)\nabla\phi_1(r,t) - \Sigma_1(r,t)\phi_1(r,t) + (1 - \beta)[v_1\Sigma_{f1}(r,t)\phi_1(r,t) + v_2\Sigma_{f2}(r,t)\phi_2(r,t)] + \sum_m \lambda_m C_m(r,t) + s(r,t) \quad (A)$$

$$\frac{1}{v_2} \frac{\partial \phi_2(r,t)}{\partial t} = \nabla \cdot D_2(r,t)\nabla\phi_2(r,t) - \Sigma_2(r,t)\phi_2(r,t) + \Sigma_{12}(r,t)\phi_1(r,t) \quad (B)$$

$$\frac{\partial C_m(r,t)}{\partial t} = \beta_m[v_1\Sigma_{f1}(r,t)\phi_1(r,t) + v_2\Sigma_{f2}(r,t)\phi_2(r,t)] - \lambda_m C_m(r,t)$$

where
$\phi_1(r,t)$ = fast neutron flux
$\Rightarrow \phi_1(r,t)/V_1$ = fast neutron density
$\phi_2(r,t)$ = thermal neutron flux
$\Rightarrow \phi_2(r,t)/V_2$ = thermal neutron density
V hd 1, $V_2$ are the average speed of neutrons in the two groups.
$\Sigma_g(r,t)$ = the macroscopic cross section for each neutron group present.

$$g = \begin{cases} 1 \text{ fast neutron group} \\ 2 \text{ thermal neutron group} \end{cases}$$

$\Rightarrow \Sigma_g(r,t) \phi_g(r,t)$ = total reaction rate at any location and time.
$\Sigma_{12}(r,t)$ = cross section for slowing down from group 1 to group 2.
$\Sigma_{fg}(r,t)$ = fission cross section for the isotopes
$V_g$ = mean number of fast neutrons produced by each fission
$\beta_m$ = fraction of fission neutrons appears from the $m^{th}$ precursor group;
Total fraction of fission neutrons which are delayed $$\beta = \sum_{m=1}^{b} \beta_m$$

$D_g(r,t)$ = diffusion coefficient for group g
$\Rightarrow -\nabla \cdot D_g \nabla \phi_g(r,t)$ = leakage rate of neutrons in group g out of a unit volume
$\lambda_m$ = decay constant (the probability of decay per second of the $m^{th}$ precursor group
$C_m(r,t)$ = concentration of the $m^{th}$ precursor group
$S(r,t)$ = external neutron source (important startup calculation).

These equations contain cross sections which are functions of time and space in the core because of the distribution of fuel composition and the dependance of fuel temperature, moderator temperature and density, soluble boron concentration, the presence of control rods, and xenon and samarium concentrations. Thus, in general, the two group parameters should be represented as a function of nine variables: the void fraction $\alpha$, the coolant temperature $T_1$, the fuel temperature $T_f$, the control rod fraction f, the liquid boron concentration $C_B$, the xenon concentration $X_e$, the samarium concentration $S_m$, the fuel type F, and the exposure E. Symbolically, we can express the two-group parameters as:

$$\Sigma = \Sigma(\alpha, T_1, T_f, f, C_b, X_e, S_m, F, E)$$

The diffusion equations are coupled to the known equations for six delayed neutron precursor concentrations, which are also space and time dependent. Because the reactor core is represented by a plurality of nodes, for example, between 150 and 450 nodes, more preferably 250 nodes (12 axial nodes, each having 225 radial nodes) it is not efficient to solve directly these equations in real-time. Accordingly, the present invention uses a modified set of the neutron diffusion flux and the delayed neutron precursor equations based on a space-time factorization of the equations and assumptions introduced at all levels, i.e., for the time, energy, and space dependencies.

The first assumption made in the derivation of the final equations used to determine the core neutronics is that the flux solution for fast (Group g=1) and thermal (Group g=2) neutrons, $\Phi_g(r,t)$, can be factored into the product of an amplitude function, N(t), and a shape function, $\phi_g(r,t)$ as follows:

$$\Phi_g(r, t) = N(t) \phi_g(r, t) \quad g=1,2 \quad (1)$$

The space-time factorization takes advantage of the fact that in most transients the core spatial response is relatively slow compared to the integrated response. The amplitude function is space independent and can be calculated relatively easily with small time steps. The shape function is assumed to be more slowly varying and, therefore, it can be calculated with longer time steps. The resulting equations with the arguments suppressed are:

$$\frac{1}{v_1} \dot{\phi}_1 = \nabla \cdot D_1 \nabla \phi_1 - \Sigma_1'\phi_1 + (1 - \beta)(v_1\Sigma_{f1}\phi_1 + v_2\Sigma_{f2}\phi_2) + \frac{1}{N}\sum_m \lambda_m C_m + \frac{1}{N} s$$

$$\frac{1}{v_2} \dot{\phi}_2 = \Lambda_2 - \Sigma_2'\phi_2 + \Sigma_{12}\phi_1 \quad (E)$$

$$\dot{C}_m = \beta_m(v_1\Sigma_{f1}\phi_1 + v_2\Sigma_{f2}\phi_2)N - \lambda_m C_m \quad (F)$$

where $$\Sigma_1' = \Sigma_1 + \frac{1}{v_1}\left(\frac{\dot{N}}{N}\right)$$

$$\Sigma_2' = \Sigma_2 + \frac{1}{v_2}\left(\frac{\dot{N}}{N}\right)$$

Equations D, E and F are the basic 1½ group, coarse-mesh, diffusion equations.

The thermal neutron diffusion in space is approximated by the function $\Lambda_2(r,t)$, i.e., $$\Lambda_2(r,t) = \nabla \cdot D_2 \nabla \psi_2(r,t) \quad (G)$$

In the simplest case, one can set $\Lambda_2(r,t)$ to zero, thus completely neglecting the thermal neutron diffusion. This assumption is the essence of the 1½ group model. This implies that the majority of thermal neutrons in a coarse-mesh node stay within the volume and only a negligible number of thermal neutrons escape the volume by diffusion near the nodal boundary. Thus, the larger the size of the coarse-mesh node, the better this simplest treatment of $\Lambda_2$ is because of very short thermal neutron diffusion length (about 2-5 cm). However, one should not use a nodal size so large as to render the treatment of the fast flux average term inaccurate.

In a reactor, surrounding the active fuel region of the core is the coolant which acts as a reflector for both fast and thermal neutrons. A reflector can significantly affect the characteristics of the neutron population within the core. In the present invention, the effects produced by a reflector are represented by applying appropriate boundary conditions at the core-reflector interfaces. The success of this approximation is dependent on the time step used to calculate the shape function. For almost all transients of interest this approximation is acceptable.

The space-time factorization method involves integrating the diffusion equations and the delay neutron precursor concentrations over the core. Two conditions are imposed:

$$N(o) = 1 \quad (2)$$

and $$\left( \frac{1}{v_1} \phi_1 + \frac{1}{v_2} \phi_2 \right) = c_0 \quad (3)$$

where the brackets refer to an integration over the entire core, $v_g$ refers to the group velocity and $c_o$ is a constant independent of time. The resulting equations for the amplitude function of neutron fluxes and delayed neutron precursors integrated over the core are:

$$\dot{N} = \frac{\rho - \beta}{\Lambda} N + \frac{1}{C_0} \sum_m \lambda_m \eta_m + \frac{1}{C_0} (s)$$

and $$\dot{\eta}_m = \frac{\beta_m}{\Lambda} C_0 N - \lambda_m \eta_m$$

where N is the total neutron population in the core and $\eta_m$ is the total delay neutron precursor of mth group in the core.

These equations are similar to the usual point kinetics equations and provide for solving the total neutron population as a function of a single parameter, time. An external neutron source term S is included in the balance equations which is important in the startup calculations. The notation is standard in the core neutronics field. $\beta_m$ is taken as constant and $\Lambda$, although it is defined as a spatial integral, is taken as constant as it is known to vary insignificantly. The reactivity $\rho$ is also a spatial integral:

$$\rho = \frac{1}{F} ((\nabla \cdot D_1 \nabla - \Sigma_1 + \nu_1 \Sigma_{f1} + \Sigma_{12})\phi_1 + \Lambda_2 + \quad (6)$$

$$(\nu_2 \Sigma_{f2} - \Sigma_2)\phi_2 + \delta_B S_B \phi_1)$$

where $$F = (\nu_1 \Sigma_{f1} \phi_1 + \nu_2 \Sigma_{f2} \phi_2) \quad (7)$$

Reactivity is calculated several times per second, e.g., four times per second, at the same frequency as the updating of the fuel and moderator properties (fuel temperature, moderator temperature and density, and boron concentration) and control rod positions. The amplitude function is then calculated at this frequency allowing for relatively rapid transients to be followed.

In order to get a stable and accurate result, the amplitude function is calculated using a dynamic implicit method which is evolved from theta method (see, e.g., Vota et al., "WIGL3-A Program for the Steady-State and Transient Solution of the One-Dimensional, Two-Group, Space-Time Diffusion Equations Accounting for Temperature, Xenon and Control Feedback," WAPD-TM-788 (February 1969)). The reactivity calculation requires the calculation of two group cross sections and the integration over the core of these cross sections as shown in Equation 6. This calculation must be made as efficient as possible and, therefore, the integral is broken down into different parts. The terms with shape gradients convert to terms that are evaluated at the core periphery and hence they are only updated when the shape function is recalculated rather than at each reactivity time step. Meanwhile, the integral components which are independent of the fuel and moderator properties can be lumped together and processed in advance, then treated as a constant in the code. The terms which depend on fuel and moderator properties and control rod position must be calculated at each reactivity time step. Therefore rearrangements are made in the functional representation of reactivity in order to improve the efficiency of that part of the calculation.

The equations for the shape function also come from the integration of the original equations over the core. The resulting equations, with the arguments suppressed and in the usual notation, are:

$$\frac{1}{v_1} \frac{d}{dt} \bar{\phi}_{1u} = [(1 - \beta)\nu_1 \Sigma_{f1u} - \Sigma_{1u}']\bar{\phi}_{1u} + (1 - \beta)\nu_2 \Sigma_{f2u} \bar{\phi}_{2u} +$$

$$\frac{1}{N} \sum_m \lambda_m \bar{C}_{mu} - \zeta_u \phi_{1u} + \phi_{1w} + \frac{1}{N} \bar{s}_u$$

$$\frac{1}{v_2} \frac{d}{dt} \bar{\phi}_{2u} = \bar{\Lambda}_{2u} - \Sigma_{2u}' \bar{\phi}_{2u} + \Sigma_{12u} \bar{\phi}_{1u}$$

$$\frac{d}{dt} \bar{C}_{mu} = N\beta_m(\nu_1 \Sigma_{f1u} \bar{\phi}_{1u} + \nu_2 \Sigma_{f2u} \bar{\phi}_{2u}) - \lambda_m \bar{C}_{mu}$$

where $$\Sigma_1' = \Sigma_1 + \frac{1}{v_1} (\dot{N}/N) \quad (11)$$

$$\Sigma_2' = \Sigma_2 + \frac{1}{v_2} (\dot{N}/N) \quad (12)$$

This approach may be called the "improved quasistatic" approximation (see, e.g., Meneley, et al., "Influence of the Shape Function Time Derivative in Spatial Kinetics," *Trans. Am. Nucl. Soc.*, 11, 225, 1968) and, if the time derivatives of the fluxes are neglected, it may be called the "quasistatic" approximation (see, e.g., Ott, "Quasistatic Treatment of Spatial Phenomena in Reactor Dynamics," *Nucl. Sci. Engr.*, 26, 563, 1966). If all time derivatives in these equations are neglected, then it may be called the "adiabatic approximation" (see, e.g., Henry, "The Application of Reactor Kinetics to the Analysis of Experiments," *Nucl. Sci. Engr.*, 3, 52, 1958, and Henry et al., "Verification of a Method for Treating Neutron Space-Time Problems," *Nucl. Sci. Engr.*, 4, 727, 1958). Among these approximations, the improved quasistatic method is preferred over the other two when applied to thermal neutronics computation. The neglect of the thermal neutron diffusion or leakage term by substituting the approximation $\Lambda_2$ in Equation 9 allows the thermal flux to be solved for explicitly in terms of the fast neutron flux in a modified asymptotic expression.

The Group 1 fast neutron flux is obtained by first integrating Equation 8 over a mesh box or node. The volume integral of the leakage term can be equivalently written as a surface integral involving the flux gradient (or equivalently, the current). The gradients are approximated using the difference between the node center flux and the interface fluxes, i.e., the fluxes at the interfaces of the six adjacent nodes. This approximation is made possible because the diffusion length (mean free path) of fast neutrons is relatively long.

Following the integration over the node and the use of the coarse mesh finite differences, the general equation for the fast group flux at any node u can be written as follows:

$$\frac{1}{v_1} \dot{\phi}_{1u} = -\Sigma_{1u}\phi_{1u} + (1-\beta)(\nu\Sigma_{f1u}\phi_{1u} + \nu\Sigma_{f2u}\phi_{2u}) + \frac{1}{N}\sum_m \lambda_m C_m + \frac{1}{N}S - \zeta_u\phi_u + \Psi_{2u} \quad (13)$$

where $\xi_u$ is a function of diffusion coefficients in node u and surrounding six nodes and $\Psi_{1w}$ refers to an expression that contains the midpoint fluxes in the nodes surrounding node u.

The neutron shape function must be solved simultaneously with the delaying neutron precursor concentrations. In order to avoid the calculation and storage of 6 concentrations at every node, the simplifying assumption is made that the delaying neutron groups are in the same proportion everywhere in the core. Hence, the average concentration in node u for delayed group m is:

$$C_{mu} = \eta_m Z_u \quad (14)$$

where $\eta_m$ is the integral over the core of precursors in Group m (see Equations 4 and 5) and $Z_u$ must be calculated along with the shape function at every node. In order to simplify this coupling the function $Z_u$ is assumed to be known from the previous time step in the calculation of the shape function and then it is updated after the fluxes are calculated.

Coarse mesh finite difference theory (CMFD) usually also refers to assuming the node average and midpoint fluxes are identical in order to solve Equation 13. In accordance with the present invention, a modified coarse mesh finite difference approach (MCMFD) is used that approximates the average flux in terms of the node center fluxes in that node and in the surrounding nodes. This approach is similar to that used by Borresen (see, e.g., Borresen, "A Simplified, Coarse-Mesh, Three-Dimensional Diffusion Scheme for Calculating the Gross Power Distribution in a Boiling Water Reactor," *Nucl. Sci. Engr.*, 44, 37, 1971) and incorporated in the known steady state neutronics codes such as PRESTO (see e.g., Borresen et al., "Application of FMSR RECORD/PRESTO for the Analysis and Simulation of Operating LWR Cores," NEACRP Specialists Meeting on Calculation of Three-Dimensional Rating Distribution in Operating Reactors, Paris, 1979), SIMULATE-E (see e.g., Cobb, et. al., "ARMP-02 Documentation, Part II, Chapter 8 - SIMULATE-E/MOD3, Computer Code Manual," EPRI NP-4574-CCM, Part II, Chapter 8, Electric Power Research Institute, September 1987), and XTG (see, e.g., Stout, "XTG: A Two-Group Three-Dimensional Reactor Simulator Utilizing Coarse Mesh Spacing and Users Manual (PWR Version)," XN-CC-28, Exxon Nuclear Company, July 1976) and transient codes such as RAMONA-3B (see, e.g., Wulff et al., "A Description and Assessment of RAMONA-3B Mod. O Cycle 4: A Computer Code with Three-Dimensional Neutron Kinetics for BWR System Transients," NUREG/CR-3664, Brookhaven National Laboratory, January 1984. Furthermore the neutron fluxes and precursor concentrations are redefined as $$\bar{\phi}_{1u} = \frac{\Psi_u}{\sqrt{D_u}}$$

$$\bar{\phi}_{1u} = \frac{\bar{\Psi}_u}{\sqrt{D_u}}$$

$$\bar{\phi}_{2u} = \frac{\bar{\Phi}_u}{\sqrt{D_u}},$$

and $$\bar{Z}_u = \frac{\bar{\zeta}_u}{\sqrt{D_u}}$$

The modified coarse mesh finite difference approach is used to convert Equation 13 into an equation containing only midpoint fluxes. The equations are then solved explicitly for the delayed neutron precursor concentrations and implicitly for the fast neutron flux and the thermal neutron flux, the result of which results in the following transient finite difference Equations S, T, and U for neutron kinetics:

$$\bar{\xi}_{ijk}^{n+1} = \Delta\tau b_{31}^n \bar{\Psi}_{ijk}^n + \Delta\tau b_{32}^n \bar{\Phi}_{ijk}^n - (1 - \Delta\tau b_{33}^n)\bar{\xi}_{ijk}^n$$

$$\bar{\phi}_{ijk}^{n+1} = \frac{1}{1 + \Delta\tau b_{22}^{n+1}} \bar{\phi}_{ijk}^n + \frac{\Delta\tau b_{21}^{n+1}}{1 + \Delta\tau b_{22}^{n+1}} \bar{\Psi}_{ijk}^{n+1} \text{ where}$$

$$= \frac{1}{1 + \Delta\tau b_{22}^{n+1}} \bar{\phi}_{ijk}^n k_{21}^{n+1} \bar{\Psi}_{ijk}^{n+1}$$

$$\Psi_u^{n+1} = \Psi_{ijk}^{n+1}$$

$$P_u^{n+1} = \frac{g_4^{n+1} - g_1^{n+1}c}{g_1^{n+1}(b + cr_{ijk}^{n+1}) + g_3^{n+1}}$$

$$S_u^{n+1} = \frac{\bar{\Psi}_u^n + g_2^{n+1}\bar{\Phi}_u^n + \Delta\tau b_{13}^n \bar{\xi}_{ijk}^n + \Delta\tau\sigma^{n+1}\bar{s}_{ijk}^{n+1}}{g_1^{n+1}(b + cr_{ijk}^{n+1}) + g_3^{n+1}}$$

$$g_2^{n+1} = \frac{\Delta\tau b_{12}^{n+1}}{1 + \Delta\tau b_{22}^{n+1}}$$

The nodal averaged fast flux at time step n+1 can be expressed as $$\bar{\Psi}_u^{n+1} = (b + cr_{ijk}^{n+1})\Psi_u^{n+1} + c\Psi_w^{n+1}$$

Thus, the computing sequence for the shape function is:

1) Compute the midpoint fast flux at the time step n+1 by using Eq. (U) with an iterative procedure.
2) Compute the average fast flux at the time step n+1 from midpoint fast flux by Eq. (V).
3) Compute the average thermal flux at time step n and the average fast flux at the time step n+1 by Eq. (T).
4) Compute the average delayed neutron precursor concentration (m=1, 2, . . . b) from their previous values (time steps n) and the average fast and thermal fluxes at time step n by Eq. (S).

The equations take into account boundary conditions at the core periphery using parameters related to the albedo, i.e., the reflectivity of the boundary. Different parameters are used for fast and thermal fluxes and for side, top, and bottom boundaries. The parameters for the side depend on how many bundles are in the node. These parameters can be obtained empirically by matching peripheral assembly powers to that found from measurements or more detailed calculations.

The final equation for the node center flux in terms of fluxes in the surrounding nodes can be written as a matrix equation:

$$A x = b \qquad (15)$$

where the vector x contains the shape function fluxes at N nodes where, as mentioned above, N is preferably on the order of 1500-4500 and the matrix A and vector b contain known quantities. This equation must be solved at every time step for the fluxes. Although A is an N×N matrix it is sparse. Furthermore, it has a very simple form which allows for an extremely quick solution. Indeed, as with the amplitude function, it is the data generation that is the primary user of computer resources and simple approximations are introduced to increase the efficiency of that part of the calculation.

By adopting the space-time factorization and the assumptions of the present invention, in particular the assumptions concerning the three shape functions and seven amplitude functions the number of calculations that must be performed for each node is substantially reduced as compared to the requirements of the prior known analysis techniques. For example, assuming that the six groups of delayed neutron precursors have the same shape results in one shape function for the whole reactor core rather than 6 shape functions. Based on the assumption that each of the six groups of delayed neutron precursors have an amplitude function, there are only 6 amplitude functions, one for each delayed neutron precursor.

Another benefit of relying on the property of the neutron shape function changing slowly over time, and the six groups of the delayed neutron precursors having approximately the same shape distribution, is that a relatively large time interval can be used for the solution of the shape function. Consequently, the present invention is useful for performing rigorous modeling of core neutronics and still low be able to calculate transients due to control rod motion, thermohydraulic disturbances, and soluble boron changes, in three dimensions, and provide for real-time simulation.

Stated otherwise, in accordance with the present invention, based on space-time factorization for the neutron groups (fast neutron flux, thermal neutron flux) and delayed neutron precursors, and assuming that (1) the fast neutron flux and thermal neutron flux share the same amplitude function which is only a function of time and (2) the six delayed neutron precursors share the shame shape function which is a function of space and time, the solution set of equations (A), (B), (C) become only 3 shape functions (fast neutron shape, thermal neutron shape, and delayed neutron precursor shape) and 7 amplitude functions (a neutron amplitude and 6 delayed neutron precursor amplitudes). The shape functions and amplitude functions are totally separate and can be solved independently; with constant amplitude when solving the shape function and constant shape while solving the amplitude function. The shape function and amplitude function are solved in parallel with respect to time.

In addition, the solution set of equations (A), (B), (C) are decoupled to shape functions and amplitude functions. By applying the modified Gauss-Seidel approach, it then becomes possible to solve the shape function with several thousand nodes in the reactor core in a real-time environment by readily available computation power.

It should be noted that the more nodes in the reactor core the more accurate for the neutron behaviors in the core. But the constraints of computation power is the major concern in the real-time simulator industry. With the present invention each fuel assembly can be advantageously treated as a node in the radial direction for a pressurized water reactor (PWR), and control cell having four fuel assemblies surrounding a control blade for a boiling water reactor (BWR). As for the axial direction, from 8 to 24 nodes can be simulated depending on the configuration of the reactor. In such a manner the local response and transient behavior can be simulated correctly.

It requires a lot of time to solve the shape function with several thousand nodes. However, the shape function is a comparatively slowly varying function of time under most plant transient condition. Therefore, in accordance with the present invention the shape function can be solved at 1 cycle per second. For amplitude functions, there are only 7 amplitudes to be solved. Therefore, it is affordable to solve amplitude functions at 4 cycle per second to get feedback from other interfacing systems quickly enough so that the response is acceptable.

The shape and amplitude calculations involve a lot of nuclear property data. The present invention reduces the computational load by processing those data and grouping them together in advance before putting them in the real-time code. In such a manner, a clot of computation time is saved so that real-time simulation can be achieved. The nuclear property data is then updated according to the interfacing parameters.

It is also noted that there is an external neutron source S(r,t) in equation (A). Consequently, the present invention can be advantageously used to simulate and to analyze neutron behaviors not only for normal operation but also during startup operation.

The present invention methods are capable of analyzing core neutronics based on monitoring changes in one or more parameters such as time in cycle (e.g., burnup, control rod deletion, and void history), axial zones of fuel enrichment and burnable poisons, movement of control rods, fuel temperature, moderator temperature, void fraction, effects of noncondensibles, xenon concentrations, samarium concentrations, soluble boron concentrations, presence of neutron sources, and spatial effects of all of the above, both locally and core-wide in three dimensions.

In a preferred embodiment, the software is written in Fortran language, adapted for operation on an UNIX operating system in any of a variety of computer systems.

One skilled in the art will appreciate that the present invention can be practiced by other than the described embodiments which are presented for purposes of illustration and not of limitation.

We claim:

1. A method for determining the neutronics parameters of a reactor core comprising the steps of:
representing the reactor core as a plurality of nodes having a coarse nodal representation;
monitoring selected neutronic parameters of the reactor core;
providing time-dependent two group neutron diffusion equations coupled to delayed neutron precursor concentrations that have been subjected to space-time factorization by shape and amplitude functions in response to the plurality of nodes;
sensing the monitored parameters; and
determining the core neutronics parameters in response to the sensed parameters and the provided two group neutron diffusion equations in constant time steps for sensing the monitored parameters and determining the core neutronics parameters in a real-time environment, the time steps being not less than one quarter second.

2. The method of claim 1 wherein representing the core further comprises representing the core as a plurality of radial and axial nodes in the range of from 1500 to 4500 total nodes, each radial node having from 8 to 24 axial nodes.

3. A method for determining the neutronics parameters of a reactor core comprising the steps of:
representing the reactor core as a plurality of nodes;
monitoring selected neutronic parameters of the reactor core;
providing a solution set of time-dependent two group neutron diffusion equations coupled to delayed neutron precursor concentrations that have been subjected to space-time factorization into shape and amplitude functions for the neutron groups and delayed neutron precursors for the plurality of nodes;
sensing the monitored parameters; and
solving the shape functions by approximation and solving amplitude functions in response to the sensed parameters in constant time steps, thereby determining the core neutronics parameters.

4. The method of claim 3 wherein representing the core further comprises representing the core as a plurality of radial nodes, each radial node having in the range of from 8 to 24 axial nodes.

5. The method of claim 3 wherein solving shape functions and amplitude functions further comprise solving said functions in real time using a first constant time step of not less than 0.25 seconds for solving the amplitude functions and a second constant time step that is a multiple of the first constant time step for solving the shape functions, thereby simulating the full range of operation of the core continuously.

6. The method of claim 3 wherein solving the amplitude functions further comprise applying a dynamic implicit solution method wherein the reactivity is calculated.

7. The method of claim 3 wherein solving the shape functions by approximation further comprises applying the Borresen approximation.

8. The method of claim 3 wherein solving the shape functions further comprises applying a modified Gauss-Seidel approach.

9. Apparatus for determining the neutronics parameters of a reactor core comprising:
a mathematical model of the reactor core as a plurality of nodes;
means for receiving selected neutronic parameters of the reactor core;
first processing means for providing a solution set of time-dependent two group neutron diffusion equations coupled to delayed neutron precursor concentrations factorized into shape and amplitude functions for the neutron groups and delayed neutron precursors for the plurality of nodes; and
second processing means for solving the shape functions by approximation and for solving amplitude functions in response to the received selected neutronic parameters in constant time steps, thereby determining the core neutrons parameters.

10. The apparatus of claim 9 wherein the second processing means comprises a third processing means for solving the shape and amplitude functions for a subset of the plurality of nodes corresponding to a local region of the core, thereby determining the core neutronics parameters for said local core region.

11. The apparatus of claim 9 wherein the plurality of nodes further comprises a plurality of radial nodes wherein each radial node has a plurality of axial nodes selected from between 8 and 24.

12. The apparatus of claim 9 wherein the second processing means operates using a first constant time steps selected on the order of 0.25 seconds for solving the amplitude functions, and a second constant time step that is a multiple of the first constant time step for solving the shape functions, thereby simulating the full range of operation of the core continuously.

13. The apparatus of claim 9 wherein the second processing means further comprises means for solving the amplitude functions by application of a dynamic implicit solution method wherein the reactivity is calculated.

14. The apparatus of claim 9 wherein the second processing means further comprises means for solving the shape functions by application of the Borresen approximation.

15. The apparatus of claim 9 wherein the second processing means further comprises means for solving the shape functions by application of a modified Gauss-Seidel approach.

16. The method of claim 3 wherein the step of providing the solution set further comprises providing the neutron groups with the same amplitude function which is only a function of time.

17. The method of claim 6 wherein the step of providing the solution set further comprise providing the delayed neutron precursors with the same shape function which is a function of time and space.

18. The method of claim 3 wherein the step of providing the solution set further comprises providing the neutron groups with the same amplitude function which is only a function of time.

19. The method of claim 3 wherein the step of providing the solution set further comprises three shape functions and seven amplitude functions.

20. The method of claim 5 wherein the second constant time step is four times the first.

21. The apparatus of claim 9 wherein the neutron groups of the solution set have the same amplitude function which is only a function of time.

22. The apparatus of claim 9 wherein the delayed neutron precursors of the solution set have the same shape function which is a function of time and space.

23. The apparatus of claim 13 wherein the neutron groups of the solution set have the same amplitude function which is only a function of time.

24. The apparatus of claim 9 wherein the solution set further comprises three shape functions and seven amplitude functions.

* * * * *

UNITED STATES PATENT AND TRADEMARK OFFICE
CERTIFICATE OF CORRECTION

PATENT NO. : 5,225,147
DATED : JULY 6, 1993
INVENTOR(S) : LIN ET AL.

It is certified that error appears in the above-indentified patent and that said Letters Patent is hereby corrected as shown below:

Column 3, line 17, "radial" should be --axial--;

Column 3, line 17-18 "radial" should be --axial--;

Column 7, line 42, "$V_s$" should be -- $_g$--;

Column 7, line 68, delete "liquid;

Column 8, line 11, "150 and 450" should be --1500 and 4500--;

Column 8, line 12, "250" should be --2500--;

Column 8, lines 23, 25, and 26 (each occurrence), "(r,t)" should be --($\underline{r}$,t)--;

Column 11, line 29, " $_{2u}$" should be -- $_{1u}$--;

UNITED STATES PATENT AND TRADEMARK OFFICE
CERTIFICATE OF CORRECTION

PATENT NO. : 5,225,147
DATED : July 6, 1993
INVENTOR(S) : LIN ET AL

It is certified that error appears in the above-indentified patent and that said Letters Patent is hereby corrected as shown below:

Column 12, line 49, insert -- $\phi_u^{n+1} = P_u^{n+1} \phi_u^{n+1} + S_u^{n+1}$ --;

Column 13, line 57, delete "low";

Column 13, line 68, "shame" should be --same--;

Column 14, line 48, "clot" should be --lot--; and

Column 16, line 23, "neutrons" should be --neutronics--.

Signed and Sealed this

Eleventh Day of April, 1995

Attest:

BRUCE LEHMAN

*Attesting Officer*  *Commissioner of Patents and Trademarks*